United States Patent [19]

Schopper

[11] 4,109,967
[45] Aug. 29, 1978

[54] BRAKE-FORCE DISTRIBUTOR FOR DUAL-CIRCUIT BRAKE SYSTEMS

[75] Inventor: Bernd Schopper, Frankfurt, Fed. Rep. of Germany

[73] Assignee: ITT Industries, Incorporated, New York, N.Y.

[21] Appl. No.: 811,007

[22] Filed: Jun. 29, 1977

[30] Foreign Application Priority Data

Aug. 26, 1976 [DE] Fed. Rep. of Germany ....... 2638377

[51] Int. Cl.² .............................................. B60T 11/34
[52] U.S. Cl. ..................................... 303/6 C; 137/87; 188/349
[58] Field of Search .................. 137/87; 188/195, 349; 303/6 C, 22 R

[56] References Cited

U.S. PATENT DOCUMENTS

| | | | |
|---|---|---|---|
| 3,467,440 | 9/1969 | Strein | 303/6 C |
| 3,841,711 | 10/1974 | Stelzer | 303/6 C |
| 4,025,123 | 5/1977 | Oberthuer | 303/22 R X |

Primary Examiner—Stephen G. Kunin
Attorney, Agent, or Firm—John T. O'Halloran; Alfred C. Hill

[57] ABSTRACT

There is provided a brake-force distributor, wherein the normally controlled rear-axle brake circuit is no longer influenced by the distributor if the front-axle brake circuit has failed. This is achieved by arranging the valve seat at a sleeve held in the operating position by the front-axle brake pressure. In the event of failure of the front-axle brake circuit, the rear-axle braking pressure will displace the sleeve into a position in which the distributor is not allowed to close.

32 Claims, 3 Drawing Figures

BRAKE-FORCE DISTRIBUTOR FOR DUAL-CIRCUIT BRAKE SYSTEMS

BACKGROUND OF THE INVENTION

This invention relates to a brake-force distributor for dual-circuit brake systems which is adapted to influence a connection of the first brake circuit between the brake-pressure source and wheel-brake cylinders, for which purpose it has a piston adapted to be acted upon in the closing direction by the pressure of the first brake circuit in opposition to a control force, the piston having a valve member adapted to close the connection at a valve seat, and which has an arrangement preventing closing of the connection in the event of failure of the second brake circuit.

Such a brake-force distributor is known from the German published patent application Dt-AS No. 1,961,941. In this application, the piston has a coaxial extension slidably sealed in the housing and acted upon by the pressure in the second brake circuit against the control force. The valve member is formed directly at the piston in its middle area and cooperates with a ring seal which surrounds the piston and is slidable in the housing and forms the valve seat. In the closing position, the piston has in its middle area a surface acted upon by the pressure of the brake-pressure source of the first brake circuit in the direction of the control force, and another surface acted upon in opposition to the control force by the pressure supplied to the wheel brake cylinders connected to the first brake circuit. In this method, all the surfaces are proportioned in such a manner that the piston is allowed to reach and remain in the closing position only if the extension is acted upon by the pressure of the second brake circuit. In the event of failure of the second brake circuit, it is always the forces acting in the direction of the control force that predominate. It is a disadvantage in this method that during normal operation the pressure of the second brake circuit has immediate influence on the piston and its movement and thus on the controlled pressure of the first brake circuit. As a result, any differential pressure between the two brake circuits caused by the brake-pressure source affects the controlled pressure of the first brake circuit. It is a further disadvantage that, due to the extension, the diameter of the valve seat has to be relatively large to ensure that suitable surfaces can be formed in the middle area of the piston.

From the German Pat. No. 1,655,294 a brake-force distributor of the type initially referred to is already known in which the second brake circuit has no immediate influence on the piston. This patent provides a retaining spring adapted to act upon the piston additionally in the direction of the control force. During normal operation, the retaining spring is spaced apart from the piston through an annular piston which is acted upon by the pressure of the second brake circuit. Thus, the retaining spring is effective only when the second brake circuit has failed. It is obvious that such a retaining spring is on principle a disadvantage because it has to be pre-loaded to a very high degree to be able to keep the piston in the open position, and in addition, during normal operation, it also has to be kept spaced apart from the piston against this preload by means of the annular piston which is acted upon by the pressure of the second brake circuit. This method draws a substantial amount of pressure fluid from the second brake circuit. Furthermore, such a brake-force distributor has high production requirements and necessitates very large dimensions.

SUMMARY OF THE INVENTION

It is an object of this invention to provide a brake-force distributor of the type initially referred to in which the only forces acting on the piston are the control force and the pressure of the first brake circuit and in which the valve member nevertheless disengages from the valve seat in the event of failure of the second brake circuit without requiring a retaining spring or the like for this purpose.

A feature of the present invention is the provision of a first brake-force distributor for dual-circuit brake systems which includes a housing and is adapted to influence a connection of a first brake circuit between a brake-pressure source and wheel-brake cylinders and a piston to make the connection adapted to be acted upon in the closing direction by the pressure of the first brake circuit in opposition to a control force, the piston having a valve member adapted to close the connection at a valve seat, the first distributor further comprising an arrangement preventing closing of the connection in the event of failure of a second brake circuit including a sleeve disposed in a slidable coaxial relationship with the piston, the sleeve having the valve seat and the sleeve being acted upon by the pressure of the second brake circuit in the direction of the valve member and in opposition to the pressure of the first brake circuit.

It is achieved by this method that during a displacement of the piston the valve member is allowed to become seated on the valve seat only if the latter is kept in its normal position by the pressure of the second brake circuit. If this is not the case, it will move along with the sleeve such that the valve passageway cannot be closed.

It is an advantage herein if the sleeve is adapted to take support on a stop provided at the piston in opposition to the control force, and if the piston can take support in turn on a stop rigidly connected to the housing. In the event of failure of the second brake circuit, this method limits the travel of the sleeve and of the piston to a predetermined amount. A straightforward design method for achieving this is to provide at the piston a radial projection forming the stop for the sleeve, this radial projection enabling the piston to take support on the stop rigidly connected to the housing.

Furthermore, it is provided to bias the sleeve in the direction of the valve member by means of a restoring spring. It is achieved by this method that all parts are in their normal positions at the beginning of a braking action.

In an embodiment in which the piston is designed as a stepped piston and in which, as a result, in the upper pressure range the pressure supplied to the wheel brake cylinders associated with the first brake circuit is merely reduced. The diameter of the valve seat corresponds to the outside diameter of the end of the sleeve closest to the valve seat.

A particularly simple design method for achieving this is to provide the sleeve with a step towards the valve member and to surround it with a slidable annular piston the cross-sectional area of which corresponds to the step of the sleeve, with a ring seal being provided between the step and the annular piston.

For a brake system having a dual-circuit operated rear axle, a second brake-force distributor is provided in a connecting line of the second brake circuit between the brake-pressure source and the wheel brake cylinders, and the brake pressure influenced by the second brake-force distributor forms, due to the action of the piston of the first brake-force distributor, the control force of the first brake-force distributor. It is provided further that the two brake-force distributors are coaxially arranged in a housing, with the piston and the sleeve of the first brake-force distributor having actuating surfaces confronting an outlet chamber of the second brake-force distributor. The result is a particularly compact unit adapted to influence the pressures in both brake circuits. It is also ensured by this method that both brake-force distributors operate in perfect synchronism as long as the brake system is intact. Owing to the fact that the diameter of the actuating surface of the piston of the first brake-force distributor, which surface is closest to the outlet chamber of the second brake-force distributor, corresponds to diameter of the valve seat of the first brake-force distributor, the first brake-force distributor is merely designed as a limiter. By virtue of its control force which depends on the second brake-force distributor it is however achieved that the first brake circuit always follows the same pressure course as the second brake circuit. Even differential pressures of the brake-pressure source will not take effect on the wheel brake cylinders connected through the brake-force distributors.

It is an advantage in this method if a stop rigidly connected to the housing is disposed in the outlet chamber to provide a support for a radial projection of the piston of the first brake-force distributor, with the sleeve taking support in turn upon the radial projection. Thus, if the second brake circuit fails, the piston and the sleeve of the first brake-force distributor are displaced by a predetermined amount only which is smaller than the admissible displacement travel of the piston of the second brake-force distributor.

BRIEF DESCRIPTION OF THE DRAWINGS

Above-mentioned and other features and objects of this invention will become more apparent by reference to the following description taken in conjunction with the accompanying drawings, in which.

DESCRIPTION OF THE PREFERRED EMBODIMENT

Figure 1:
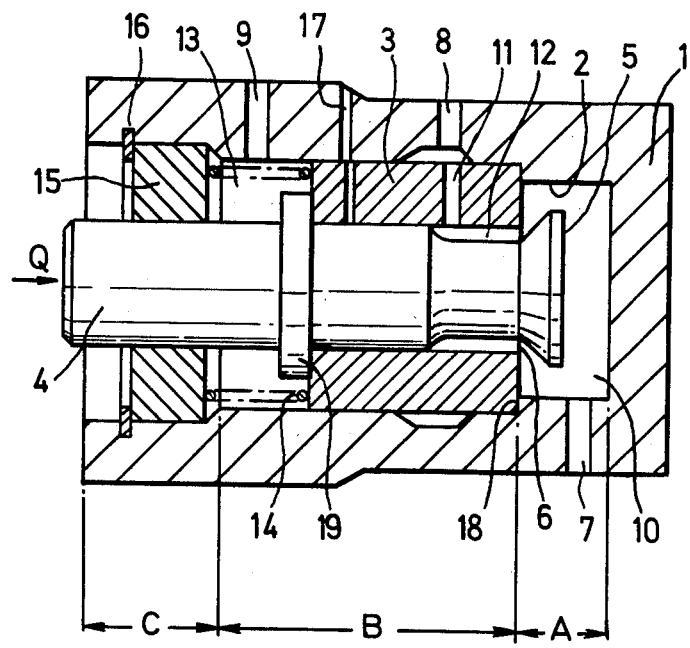
FIG. 1 is a longitudinal cross-sectional view of a first embodiment of the brake-force distributor in accordance with the principles of the present invention.

FIG. 1 shows a housing 1 with a stepped blind-end bore 2. Blind-end bore 2 is subdivided into tapering sections A, B and C. Slidably sealed in section B is a sleeve 3 accommodating in turn a slidably sealed piston 4. At its end extending into section A, piston 4 carries a valve member 5. A valve seat 6 cooperating with valve member 5 is provided at sleeve 3. The other end of piston 4 extends through section C out of housing 1. In section C, piston is guided slidably sealed through a ring 15. Ring 15 is in fluid-tight engagement with blind-end bore 2 and held firm with the housing by means of a circlip 16. Outside housing 1, a control force Q acts on piston 4 in the direction of valve member 5 which is indicated by an arrow. The control force Q may be applied by a pre-loaded spring or in dependence on the axle load, for example.

Thus, an outlet chamber 10 is formed in section A which can be connected with wheel cylinders not shown through a port 7. A port 8 which opens into section B can be connected with the first brake circuit of the pressure-fluid source. Port 8 is in communication with an annular groove 12 of piston 4 through a channel 11 in sleeve 3. Annular groove 12 extends as far as to valve member 5. Practically, it forms an inlet chamber which is at all times in communication with the pressure-fluid source. Sleeve 3 and ring 15 define an annular chamber 13 therebetween which can be connected with the second brake circuit of the pressure-fluid source through a port 9. Annular chamber 13 accommodates a restoring spring 14 bearing with one end against ring 15 and with the other end against sleeve 3, thereby keeping sleeve 3 against a stop 18 in the normal position. In annular chamber 13, piston 4 has a radial projection 19. Between the seals (not shown) of piston 4 and sleeve 3 towards annular chamber 13 and towards port 8 or annular groove 12, there is provided a bore 17 which is open for communication with atmosphere to ensure that damaged seals are not left unnoticed.

With regard to the mode of operation as described in the following, it should be noted that in the embodiment of FIG. 1 the diameter of valve seat 6 corresponds to the seal diameter of piston 4 in sleeve 3 and in ring 15.

Before braking commences, all parts are in their illustrated positions. Accordingly, there exists a direct connection between port 8 and port 7. As a result, there occurs at the same time a pressure increase in annular groove 12, outlet chamber 10 and annular chamber 13. The pressure in annular chamber 13 has no influence on piston 4. However, it acts on sleeve 3 in the direction of stop 18 such that it remains in its position notwithstanding the pressure in outlet chamber 10 which acts thereon in the opposite direction. Piston 4 is acted upon by the pressure in outlet chamber 10 in opposition to the control force Q. As soon as the pressure is high enough to overcome control force Q, piston 4 will be displaced to the left, thereby causing valve member 5 to become seated on valve seat 6 which causes an interruption of the connection between annular groove 12 and outlet chamber 10. As a result, the pressure in the outlet chamber is not allowed to increase further independent of the pressure of the pressure-fluid source. Only when the pressure of the pressure-fluid source drops again below this level is sleeve 3 displaced to the left by the pressure in the outlet chamber 10, in opposition to the decreased pressure in annular chamber 13, thereby re-establishing the connection between annular groove 12 and outlet chamber 10. This causes an immediate pressure drop in outlet chamber 10 so that piston 4 and sleeve 3, upon the action of the control force and the restoring spring 14, are returned to their illustrated positions.

It is to be understood that ports 7 and 8 are interchangeable. The effect thereby obtained is that during pressure decrease sleeve 3 is not displaced. To achieve disengagement of the valve seat, piston 4 is then displaced by the control force Q in opposition to the decreasing pressure of the pressure-fluid source in chamber 10.

If the second brake circuit fails, there is no pressure in annular chamber 13 which could keep sleeve 3 in its illustrated position during a braking operation. Thus, sleeve 3 is always kep in abutment against the radial projection 19 of piston 4 by the pressure in outlet chamber 10 and moved, in accordance with this pressure, towards the left against control force Q. together with piston 4. This movement is at its maximum when projection 19 has reached ring 15. Also in the event of the second brake circuit failing, sleeve 3 is immediately shifted against projection 19 as a result of the pressure then collapsing in annular chamber 13. When the second brake circuit has failed, it is thus impossible to close the connection between annular groove 12 and outlet chamber 10.

Figure 2:
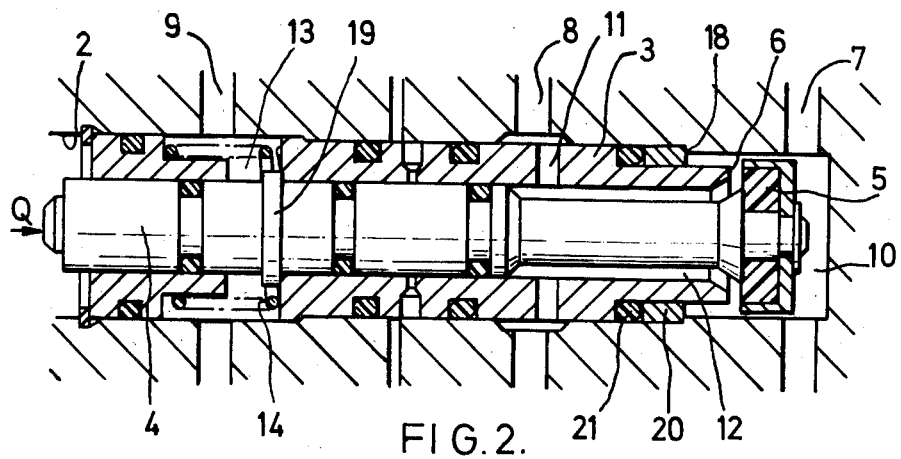
FIG. 2 is a longitudinal cross-sectional view of a second embodiment of the brake-force distributor in accordance with the principles of the present invention.

In the embodiment of FIG. 2, the parts identical with those of FIG. 1 are assigned the same reference numerals so that these need not be explained again. A substantial difference to FIG. 1 is, however, that sleeve 3 is stepped in the direction towards valve member 5, and valve seat 6 is provided at the outside diameter of the stepped end of sleeve 3. Since by these means the valve diameter is larger than the seal diameter of piston 4 in sleeve 3, there results, with the valve passageway closed, an annular surface by means of which piston 4 is actuated by valve member 5 by the pressure in annular groove 12 in the direction towards outlet chamber 10.

Another difference is that the stepped end of sleeve 3 has slidably disposed thereon an annular piston 20 the outside diameter of which corresponds to that of the rest of sleeve 3. Annular piston 20 is supported upon stop 18 in the direction towards outlet chamber 10. A ring seal 21 disposed between annular piston 20 and the step of sleeve 3 is so designed that it provides a seal in the direction towards outlet chamber 10 both at sleeve 3 and at bore 2. This avoids the necessity for annular piston 20 to have seals of its own. In this embodiment, the other seals, which in principle are obvious features, are also shown.

The mode of operation of the embodiment of FIG. 2 is as follows:

As pressure starts building up, pressure fluid is delivered to ports 8 and 9. Since the valve passageway is open, pressure will then evenly develop in annular groove 12 and outlet chamber 10. Such a pressure will also prevail in annular chamber 13 so that sleeve 3 is pressure-balanced and kept in the illustrated position by restoring spring 14. As soon as the pressure in annular groove 12 and outlet chamber 10 is high enough to be able to overcome the control force Q with an actuation surface corresponding to the seal diameter of piston 4 in sleeve 3, piston 4 is shifted to the left and valve member 5 closes the valve passageway at valve seat 6.

As pressure continues building up, the pressure in annular groove 12 is applied to the right to piston 4 to an annular surface thereof corresponding to the diameter of valve seat 6 less the seal diameter of piston 4 in sleeve 3. Piston 4 is acted upon to the left on a surface determined by the diameter of valve seat 6 by the pressure in outlet chamber 10. As a result, it will always be lifted off valve seat 6 temporarily, thereby allowing such an amount of pressure fluid to be delivered into outlet chamber that these forces are again in equilibrium with the control force Q. Thus the pressure build-up occurring in outlet chamber 10 is reduced as compared to the pressure in annular groove 12. During the whole period of pressure build-up, sleeve 3 is always pressure-balanced because a suitable pressure is built up in annular chamber 13. Sleeve 3 remains also pressure-balanced when pressure decreases. However, the force acting on piston 4 to the right will become less so that piston 4 will be displaced to the left together with sleeve 3 by the action of the pressure in outlet chamber 10. As a result, outlet chamber 10 increases its volume so that the pressure therein becomes likewise less. Only when this pressure has dropped to a magnitude enabling control force Q to displace piston 4 to the right, thereby causing valve member 5 to be lifted off valve seat 6, is free flow of pressure fluid between port 8 and port 7 reestablished. Accordingly, the pressure ratio between port 8 and port 7 during pressure decrease is always the same as during pressure increase, leaving out the minor differences caused by the frictional forces of the seals.

In the event of failure of the second brake circuit, this embodiment functions in the same manner as the embodiment of FIG. 1. Due to the lack of pressure in annular chamber 13, sleeve 3 is always held against projection 19 and closing of the valve passageway is made impossible.

Figure 3:
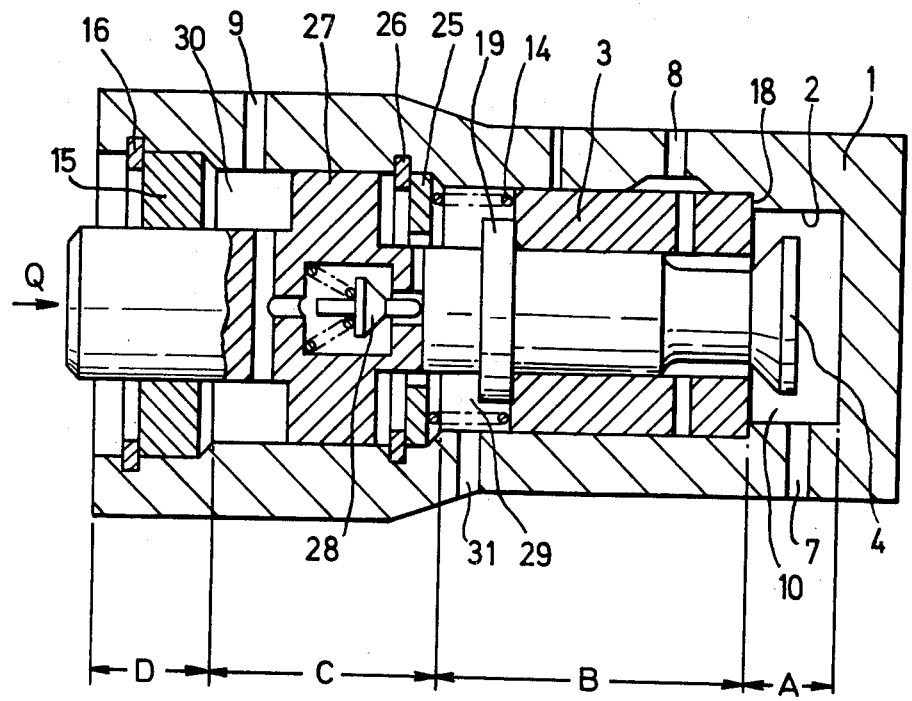
FIG. 3 is a longitudinal cross-sectional view of a third embodiment of the brake-force distributor designed to influence the pressure in both brake circuits in accordance with the principles of the present invention.

In the embodiment of FIG. 3, the first brake-force distributor constructed in accordance with the invention is combined with a second brake-force distributor for the second brake circuit. In this embodiment, bore 2 has a further section D. The parts disposed in sections A and B correspond fully to those of FIG. 1 and need not be explained again. However, piston 4 does not extend out of housing 1 but extends merely into section C.

Section C accommodates a stepped piston 27 disposed slidably sealed therein and extending with its smaller diameter end through ring 15 now disposed in section D out of housing 1 and being acted upon by the control force Q in the direction of the first brake-force distributor. Stepped piston 27 has a larger actuation end closest to the first brake-force distributor which defines an outlet chamber 29. A smaller actuation end closest to ring 15 defines an inlet chamber 30. Inlet chamber 30 is adapted to communicate with the second brake circuit of the pressure-fluid source via port 9. Via a port 31, outlet chamber 29 is adapted to communicate with wheel cylinders to be connected to the second brake circuit. A channel, which is adapted to be closed by a mechanically actuatable valve member 28, extends through stepped piston 27, connecting inlet chamber 30 with outlet chamber 29. Valve member 28 can be actuated in such a manner as to open the channel as long as stepped piston 27 lies in abutment with piston 4.

Outlet chamber 29 also accommodates a stop ring 25 secured by a circlip 26 and limiting movement of piston 4 to the left by cooperating with projection 19. Restoring spring 14 is disposed between stop ring 25 and sleeve 3.

The mode of operation of the embodiment of FIG. 3 is as follows:

With pressure build-up commencing, pressure fluid is delivered to ports 8 and 9 which for the time being reaches outlet chambers 10 and 29 unhindered. However, as soon as a pressure is reached at which stepped piston 27 is displaced to the left against control force Q, valve member 28 will close and further pressurization of outlet chamber 29 will be reduced. By these means, as pressure continues building up, piston 4 will also be displaced to the left so that the pressure allowed to build up in outlet chamber 10 is only insignificantly higher than in outlet chamber 29. Thus the pressure in outlet chamber 10 always follows the pressure course in outlet chamber 29. When pressure builds up above the changepoint (first closing of the brake-force distributors), piston 4 is displaced to the right until a suitable amount of pressure fluid has flown into outlet chamber 10. During pressure decrease, piston 4 moves to the left together with sleeve 3 in the manner of a floating piston, thereby increasing the volume of outlet chamber 10 so that also in this instance the pressure in outlet chamber 10 will always adapt itself to the pressure in outlet chamber 29. This function of a floating piston may also occur during pressure build-up if preceded by a pressure decrease during which the change-point was not reached and sleeve 3 is not yet in abutment with stop 18.

In the event of failure of the second brake circuit, pressure will not be built up in outlet chamber 29. Thus the pressure in outlet chamber 10 will keep sleeve 3 always against projection 19 so that the connection with port 7 cannot be interrupted. As far as piston 4 is concerned, it will first take support upon stepped piston 27 against control force Q. In this method, its travel of displacement against control force Q will, however, be limited by stop ring 25 as soon as projection 19 is in abutment therewith.

If the first brake circuit fails, there will be completely normal operation of the second brake-force distributor formed by stepped piston 27.

While I have described above the principles of my invention in connection with specific apparatus it is to be clearly understood that this description is made only by way of example and not as a limitation to the scope of my invention as set forth in the objects thereof and in the accompanying claims.

I claim:

1. A first brake-force distributor for dual-circuit brake systems which includes a housing and is adapted to influence a connection of a first brake circuit between a brake-pressure source and wheel-brake cylinders and a piston to make said connection adapted to be acted upon in the closing direction by the pressure of said first brake circuit in opposition to a control force, said piston having a valve member adapted to close said connection at a valve seat, said first distributor further comprising
    an arrangement preventing closing of said connection in the event of failure of a second brake circuit including
        a sleeve disposed in a slidable coaxial relationship with said piston;
        said sleeve having said valve seat;
        said sleeve being acted upon by the pressure of said second brake circuit in the direction of said valve member and in opposition to the pressure of said first brake circuit;
        said sleeve being supported by a first stop provided on said piston in opposition to said control force, and
        said piston being supported by a second stop rigidly connected to said housing.

2. A distributor according to claim 1, wherein said first stop is formed by a radial projection surrounding said piston to enable said piston to be supported by said second stop.

3. A distributor according to claim 2, wherein said sleeve is biased in the direction of said valve member by a restoring spring.

4. A distributor according to claim 3, wherein the diameter of said valve seat corresponds to the outside diameter of the end of said sleeve adjacent said valve seat.

5. A distributor according to claim 4, wherein the outer diameter of said sleeve is provided with a step towards said valve member, and
    further including a slidable annular piston surrounds the reduced diameter portion of said sleeve and has a cross-sectional area corresponding to said step, and
    a ring seal disposed between said step and said annular piston.

6. A distributor according to claim 3, further including
    a second brake-force distributor similar to said first distributor disposed in a connecting line to said second brake circuit between said brake-pressure source and wheel-brake cylinders, and
    brake pressure influenced by said another distributor forms its control force due to the action of said piston.

7. A distributor according to claim 6, wherein said first and second distributors are disposed in tandem with each other and coaxially in said housing, and
    an output chamber of said second distributor being defined by actuation surfaces of said sleeve and said piston of said first distributor.

8. A distributor according to claim 7, wherein the diameter of the actuating surface of said piston of said first distributor closest to said output chamber of said second distributor corresponds to the diameter of said valve seat of said first distributor.

9. A distributor according to claim 8, further including
    a third stop rigidly connected to said housing disposed in said output chamber of said second distributor to provide a support for said radial projection of said piston of said first distributor, and
    said sleeve of said first distributor being supported by said radial projection of said piston of said first distributor.

10. A distributor according to claim 7, further including
    a third stop rigidly connected to said housing disposed in said output chamber of said second distributor to provide a support for said radial projection of said piston of said first distributor, and
    said sleeve of said first distributor being supported by said radial projection of said piston of said first distributor.

11. A distributor according to claim 1, wherein said sleeve is supported by a radial projection surrounding said piston.

12. A distributor according to claim 11, wherein said sleeve is biased in the direction of said valve member by a restoring spring.

13. A distributor according to claim 12, wherein the diameter of said valve seat corresponds to the outside diameter of the end of said sleeve adjacent said valve seat.

14. A distributor according to claim 13, wherein the outer diameter of said sleeve is provided with a step towards said valve member, and further including
    a slideable annular piston surrounds the reduced diameter portion of said sleeve and has a cross-sectional area corresponding to said step, and
    a ring seal disposed between said step and said annular piston.

15. A distributor according to claim 12, further including
    a second brake-force distributor similar to said first distributor disposed in a connecting line to said second brake circuit between said brake-pressure source and wheel-brake cylinders, and brake pressure influenced by said another distributor forms its control force due to the action of said piston.

16. A distributor according to claim 15, wherein said first and second distributors are disposed in tandem with each other and coaxially in said housing, and an output chamber of said second distributor being defined by actuation surfaces of said sleeve and said piston of said first distributor.

17. A distributor according to claim 16, wherein the diameter of the actuating surface of said piston of said first distributor closest to said output chamber of said second distributor corresponds to the diameter of said valve seat of said first distributor.

18. A distributor according to claim 17, further including a third stop rigidly connected to said house disposed in said output chamber of said second distributor to provide a support for said radial projection of said piston of said first distributor, and said sleeve of said first distributor being supported by said radial projection of said piston of said first distributor.

19. A distributor according to claim 1, wherein said sleeve is biased in the direction of said valve member by a restoring spring.

20. A distributor according to claim 19, wherein the diameter of said valve seat corresponds to the outside diameter of the end of said sleeve adjacent said valve seat.

21. A distributor according to claim 20, wherein the outer diameter of said sleeve is provided with a step towards said valve member, and further including a slideable annular piston surrounds the reduced diameter portion of said sleeve and has a cross-sectional area corresponding to said step, and a ring seal disposed between said step and said annular piston.

22. A distributor according to claim 19, wherein a second brake-force distributor similar to said first distributor disposed in a connecting line to said second brake circuit between said brake-pressure source and wheel-brake cylinders, and brake-pressure influenced by said another distributor forms its control force due to the action of said piston.

23. A distributor according to claim 22, wherein said first and second distributors are disposed in tandem with each other and coaxially in said housing, and an output chamber of said second distributor being defined by actuation surfaces of said sleeve and said piston of said first distributor.

24. A distributor according to claim 23, wherein the diameter of the actuating surface of said piston of said first distributor closest to said output chamber of said second second distributor corresponds to the diameter of said valve seat of said first distributor.

25. A distributor according to claim 24, further including a third stop rigidly connected to said house disposed in said output chamber of said second distributor to provide a support for said radial projection of said piston of said first distributor, and said sleeve of said first distributor being supported by said radial projection of said piston of said first distributor.

26. A distributor according to claim 1, wherein the diameter of said valve seat corresponds to the outside diameter of the end of said sleeve adjacent said valve seat.

27. A distributor according to claim 26, wherein the outer diameter of said sleeve is provided with a step towards said valve member, and further including a slideable annular piston surrounds the reduced diameter portion of said sleeve and has a cross-sectional area corresponding to said step, and a ring seal disposed between said step and said annular piston.

28. A distributor according to claim 1, wherein a second brake-force distributor similar to said first distributor disposed in a connecting line to said second brake circuit between said brake-pressure source and wheel brake cylinders, and brake pressure influenced by said another distributor forms it control force due to the action of said piston.

29. A distributor according to claim 28, wherein said first and second distributors are disposed in tandem with each other and coaxially in said housing, and an output chamber of said second distributor being defined by actuation surfaces of said sleeve and said piston of said first distributor.

30. A distributor according to claim 29, wherein the diameter of the actuating surface of said piston of said first distributor closest to said output chamber of said second distributor corresponds to the diameter of said valve seat of said first distributor.

31. A distributor according to claim 30, further including a third stop rigidly connected to said housing disposed in said output chamber of said second distributor to provide a support for said radial projection of said piston of said first distributor, and said sleeve of said first distributor being supported by said radial projection of said piston of said first distributor.

32. A distributor according to claim 21, wherein the outer diameter of said sleeve is provided with a step towards said valve member, and further including a slideable annular piston surrounds the reduced diameter portion of said sleeve and has a cross-sectional area corresponding to said step, and a ring seal disposed between said step and said annular piston.

* * * * *